US012591720B2

(12) United States Patent
Lee et al.

(10) Patent No.: US 12,591,720 B2
(45) Date of Patent: Mar. 31, 2026

(54) TRAFFIC SIMULATION METHOD FOR CREATING AN OPTIMIZED OBJECT MOTION PATH IN THE SIMULATOR

(71) Applicant: Korea Electronics Technology Institute, Seongnam-si (KR)

(72) Inventors: Seon Young Lee, Seoul (KR); Kyoung Won Min, Seongnam-si (KR); Haeng Seon Son, Seongnam-si (KR); Young Bo Shim, Seongnam-si (KR); Yun Jeong Kim, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 981 days.

(21) Appl. No.: 17/779,606

(22) PCT Filed: Nov. 25, 2020

(86) PCT No.: PCT/KR2020/016799
§ 371 (c)(1),
(2) Date: May 25, 2022

(87) PCT Pub. No.: WO2022/114253
PCT Pub. Date: Jun. 2, 2022

(65) Prior Publication Data
US 2023/0169228 A1 Jun. 1, 2023

(30) Foreign Application Priority Data
Nov. 25, 2020 (KR) ........................ 10-2020-0159596

(51) Int. Cl.
*G06F 30/20* (2020.01)
*G06F 111/20* (2020.01)

(52) U.S. Cl.
CPC .......... *G06F 30/20* (2020.01); *G06F 2111/20* (2020.01)

(58) Field of Classification Search
CPC ...... G06F 30/20; G06F 2111/20; G06F 30/15; G08G 1/00; G08G 1/01
See application file for complete search history.

(56) References Cited

U.S. PATENT DOCUMENTS

2011/0298603 A1* 12/2011 King ...................... G08G 1/042
340/436
2019/0286766 A1* 9/2019 Yoshida ................... G08G 1/00
2021/0370972 A1* 12/2021 Bagschik ............... G06N 20/20

FOREIGN PATENT DOCUMENTS

JP H11-39503 A * 2/1999 ............ G06F 17/00
KR 10-2017-0132515 A 12/2017

OTHER PUBLICATIONS

Boxill SA. An evaluation of 3-D traffic simulation modeling capabilities. Texas Southern University. Center for Transportation Training and Research; Jun. 1, 2007. (Year: 2007).*
(Continued)

*Primary Examiner* — Chuen-Meei Gan
(74) *Attorney, Agent, or Firm* — NSIP Law

(57) ABSTRACT

Provided is a traffic simulation for controlling a motion of an object, such as a vehicle, a pedestrian moving on a road or a pavement, in a driving simulation, an autonomous driving simulation, or the like. A traffic simulation method according to an embodiment of the present disclosure includes the steps of: importing a new moving object into a simulation environment of a simulator; retrieving data of a moving path and a start point of the moving object which is created based on a function, among pre-stored data; calculating 3D coordinates regarding a position of the moving object; moving the moving object along the moving path in the simulation environment, based on the calculated 3D coordinates; and calculating a next position of the moving object.

12 Claims, 4 Drawing Sheets

(56)     References Cited

OTHER PUBLICATIONS

Yun, SeungJae, et al. "Genetic Algorithm Based 3D Environment Local Path Planning for Autonomous Driving of Unmanned Vehicles in Rough Terrain." Journal of the Korea Institute of Military Science and Technology 20.6 (2017): 803-812.

Korean Office Action issued on May 20, 2021, in counterpart Korean Patent Application No. 10-2020-0159596 (3 pages in English and 4 pages in Korean).

* cited by examiner

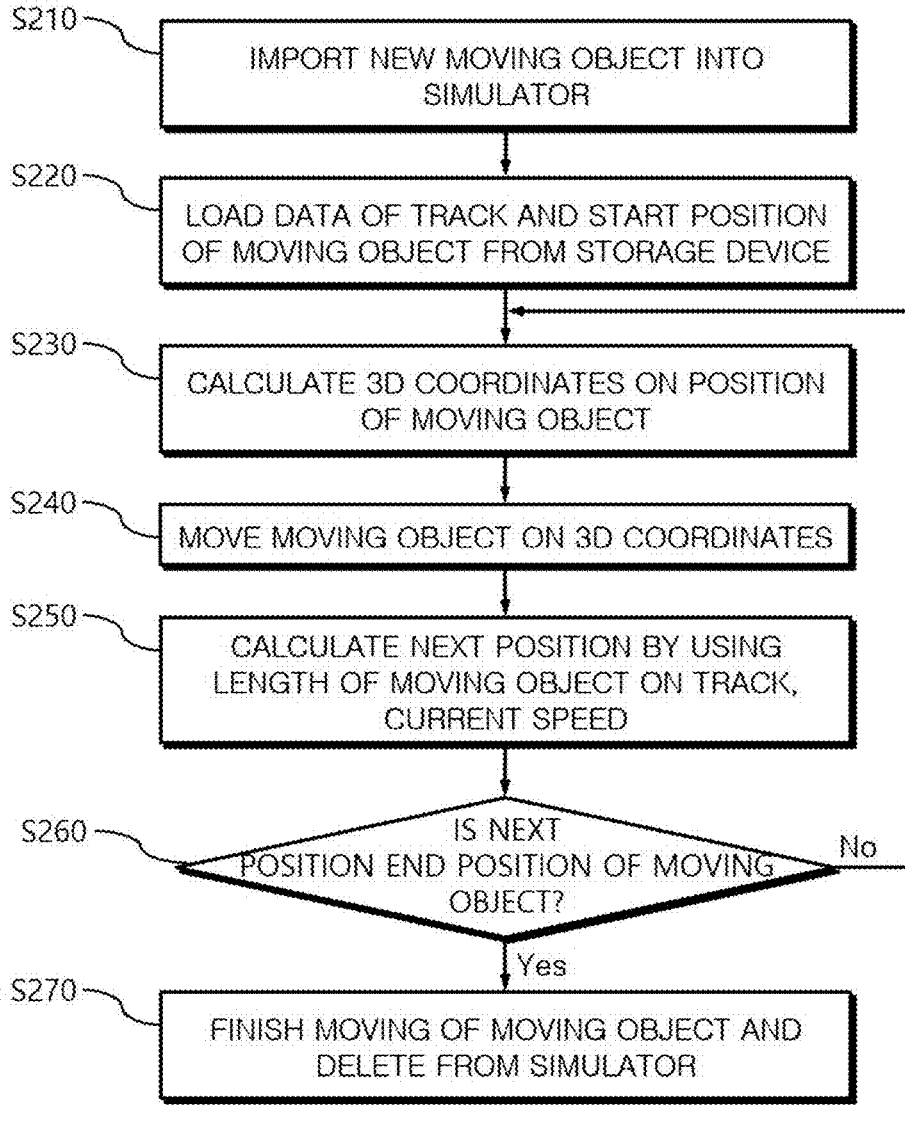

S210 — IMPORT NEW MOVING OBJECT INTO SIMULATOR

S220 — LOAD DATA OF TRACK AND START POSITION OF MOVING OBJECT FROM STORAGE DEVICE

S230 — CALCULATE 3D COORDINATES ON POSITION OF MOVING OBJECT

S240 — MOVE MOVING OBJECT ON 3D COORDINATES

S250 — CALCULATE NEXT POSITION BY USING LENGTH OF MOVING OBJECT ON TRACK, CURRENT SPEED

S260 — IS NEXT POSITION END POSITION OF MOVING OBJECT?    No

Yes

S270 — FINISH MOVING OF MOVING OBJECT AND DELETE FROM SIMULATOR

FIG. 2

TRAFFIC SIMULATION METHOD FOR CREATING AN OPTIMIZED OBJECT MOTION PATH IN THE SIMULATOR

CROSS REFERENCE TO RELATED APPLICATIONS

This application is a U.S. National Stage Application of International Application No. PCT/KR2020/016799, filed on Nov. 25, 2020, which claims the benefit under 35 USC 119 (a) and 365 (b) of Korean Patent Application No. 10-2020-0159596, filed on Nov. 25, 2020, in the Korean Intellectual Property Office, the entire disclosure of which is incorporated herein by reference for all purposes.

TECHNICAL FIELD

The present disclosure relates to a traffic simulation method, and more particularly, to a traffic simulation for controlling a motion of an object, such as a vehicle, a pedestrian moving on a road or a pavement, in a driving simulation, an autonomous driving simulation, or the like.

BACKGROUND ART

A traffic simulation method of an object used in a related-art simulator expresses a moving path of a vehicle and a pedestrian as points, and moves while tracing the moving path of the object on a road or a pavement, based on a waypoint which is a connection of these points.

FIG. 1 illustrates a method of expressing a path of a road by using a related-art waypoint method.

This method requires lots of points in expressing an object moving path, and requires a space of a large capacity to express moving paths of many objects existing within a simulator and to store them in a storage device. In addition, since the degree of precision of tracing a path, along which an object will move, is directly influenced by the number of points, if a resolution of points for expressing a moving path is reduced, there may be a problem that an error in expressing an object moving path increases.

DISCLOSURE

Technical Problem

The present disclosure has been developed in order to address the above-discussed deficiencies of the prior art, and an object of the present disclosure is to provide a traffic simulation method which proceeds with a simulation while controlling a vehicle based on function-based moving path creation data, thereby precisely creating a motion of an object in a simulator and enhancing reliability of validation regarding an operation of an algorithm mounted in an autonomous driving vehicle.

Technical Solution

According to an embodiment of the present disclosure to achieve the above-described object, a traffic simulation method includes the steps of: importing a new moving object into a simulation environment of a simulator; retrieving data of a moving path and a start point of the moving object which is created based on a function, among pre-stored data; calculating 3D coordinates regarding a position of the moving object; moving the moving object along the moving path in the simulation environment, based on the calculated 3D coordinates; and calculating a next position of the moving object.

In addition, the step of retrieving the data of the moving path and the start point may include retrieving data regarding a pre-defined moving path and a start point within the pre-defined moving path, by combining one or more functions.

In addition, the one or more functions may include at least one of a line function, an arc function, a clothoid curve function, a third-degree polynomial function, and a parametric third-degree polynomial function.

In addition, the start point of the moving object may refer to a first start point of the moving object within the moving path, and the 3D coordinates regarding the position of the moving object may refer to to a current point of the moving object within the moving path.

In addition, the step of retrieving the data of the moving path and the start point may include, when the new moving object starts operating in the simulator, retrieving data of a moving path and a start point of the moving object which starts operating, and the step of calculating the 3D coordinates may include calculating 3D coordinates (x, y, z) of the moving object within the moving path, based on the retrieved data of the moving path and the start point, and placing the moving object on the calculated coordinates.

In addition, the step of calculating the next position may include calculating the next position of the moving object, based on the moving path, a length of the moving object, 3D coordinates, and a current speed of the moving object.

In addition, the step of calculating the next position may include calculating the next position of the moving object by using Equation 1 presented below:

$$d_{next} = d_{curr} + \text{Speed} \times \text{Step\_Time} + \text{Vehicle\_length} \qquad \text{Equation 1}$$

where $d_{next}$ is a relative distance from a position of the start point of the moving object to the next position, $d_{curr}$ is a relative distance from a position of the first start point of the moving object to a current position, speed is a current speed of the moving object, step_time is a time that is required for the moving object to move to the next position, and vehicle_length is a length of the moving object:

According to another embodiment of the present disclosure, a traffic simulation system includes: a processor configured to import a new moving object into a simulation environment of a simulator, to retrieve data of a moving path and a start point of the moving object which is created based on a function, among pre-stored data, to calculate 3D coordinates regarding a position of the moving object, to move the moving object along the moving path in the simulation environment, based on the calculated 3D coordinates, and to calculate a next position of the moving object; and an output unit configured to output information which is processed and calculated through the processor.

Advantageous Effects

According to embodiments of the present disclosure as described above, a motion of an object within a simulator may be precisely created and reliability of validation regarding an operation of an algorithm mounted in an autonomous driving vehicle may be enhanced.

DESCRIPTION OF DRAWINGS

FIG. 2 is a flowchart provided to explain a traffic simulation method according to an embodiment of the present disclosure;

BEST MODE

Hereinafter, the present disclosure will be described in more detail with reference to the drawings.

Figure 3:
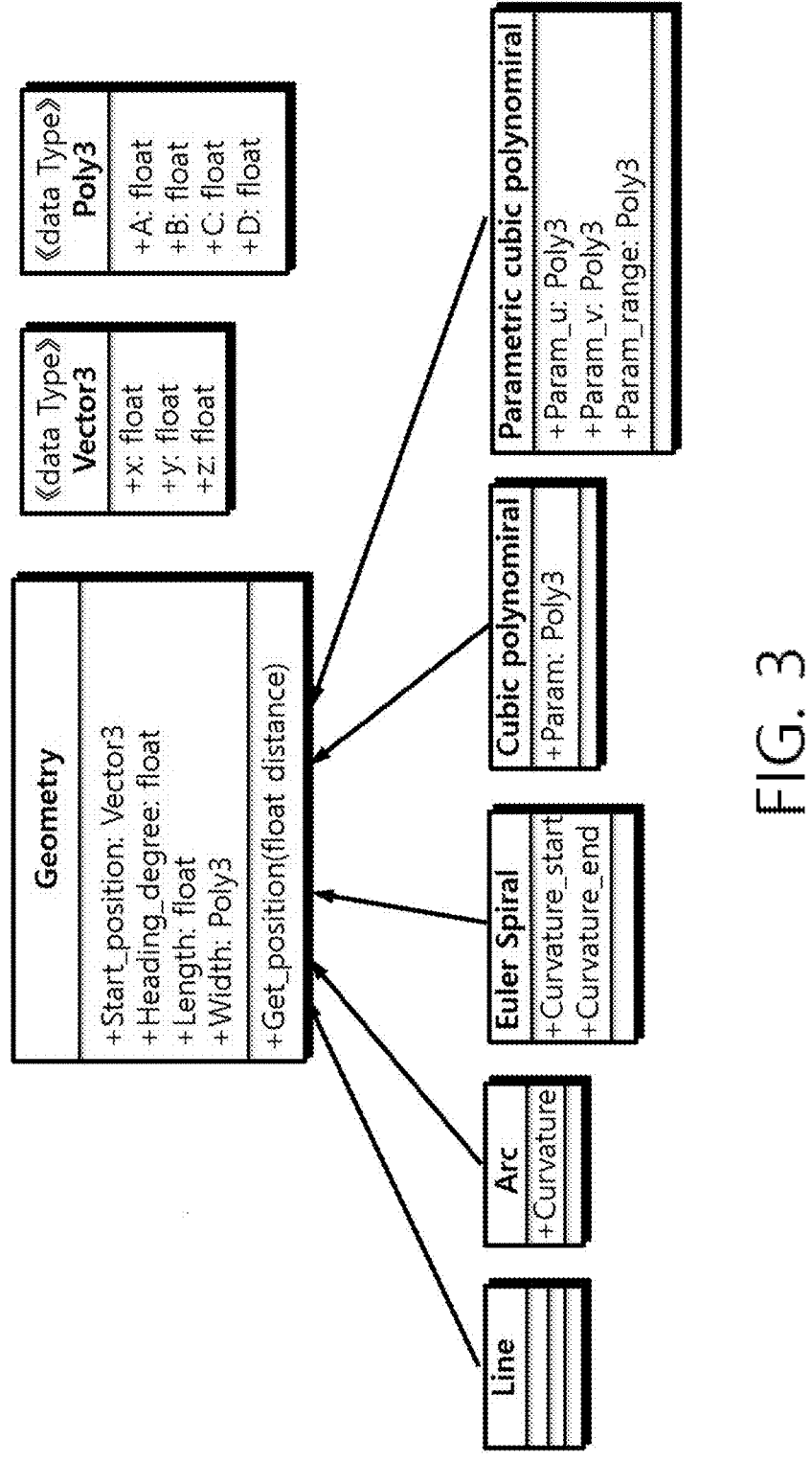
FIG. 3 is a view illustrating a data structure for expressing a moving path of an object according to an embodiment of the present disclosure.
Figure 4:
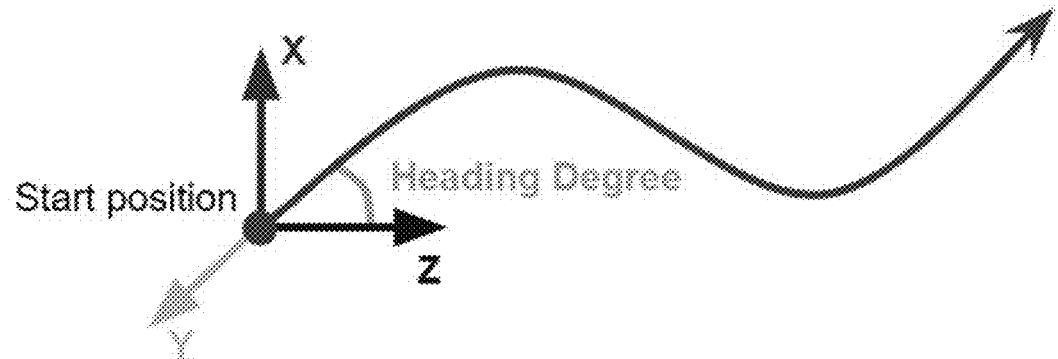
FIG. 4 is a view illustrating a road path using the traffic simulation method shown in FIG. 2.

FIG. 2 is a flowchart provided to explain a traffic simulation method according to an embodiment of the present disclosure, FIG. 3 is a view illustrating a data structure for expressing a moving path of an object according to an embodiment of the present disclosure, and FIG. 4 is a view illustrating a road path using the traffic simulation method shown in FIG. 2.

The traffic simulation method according to the present embodiment is provided to proceed with a simulation by controlling a vehicle based on function-based moving path creation data.

Referring to FIG. 2, the traffic simulation method according to the present embodiment may import a new moving object into a simulation environment of a traffic simulation system, which is a simulator (S210), and then, may retrieve data of a moving path and a start point of the moving object that is created based on a function among data pre-stored in a storage unit (S220).

That is, the traffic simulation method according to the present embodiment may move the moving object while tracing the moving path of the moving object, by using the moving path (Track) and a position of the start point (Start position) of the moving object which is pre-defined, instead of using a waypoint.

To achieve this, at the step of retrieving the data of the moving path and the start point, one or more functions may be combined, and data regarding a pre-defined moving path and a start point within the pre-defined moving path may be retrieved.

Herein, the one or more functions may include at least one of a line function, an arc function, a clothoid curve function, a third-degree polynomial function, and a parametric third-degree polynomial function, as shown in FIG. 3.

The line function is a function that is used to linearly express a moving path, and the arc function is a function that is used to express a moving path with a curve.

In addition, the clothoid curve function is a function that is used to express a moving path with a curve, and uses a curve whose curvature increases in proportion to an increasing curve length, and whose radius decreases in inverse proportion to the increasing curve length.

In addition, the third-degree polynomial function is a function that is used to express a moving path with a graph of a third-degree polynomial, and the parametric third-degree polynomial function is a function that is used to express a moving path with a straight line or a curve which is defined by an equation using various independent variables.

To summarize, a moving path may be created by a combination of one or more of the line function, the arc function, the clothoid curve function, the third-degree polynomial function, and the parametric third-degree polynomial function, and may include data regarding a start point (Start_position), an angle of the moving object (heading_degree), a length of a vehicle, a width of the vehicle.

Figure 1:
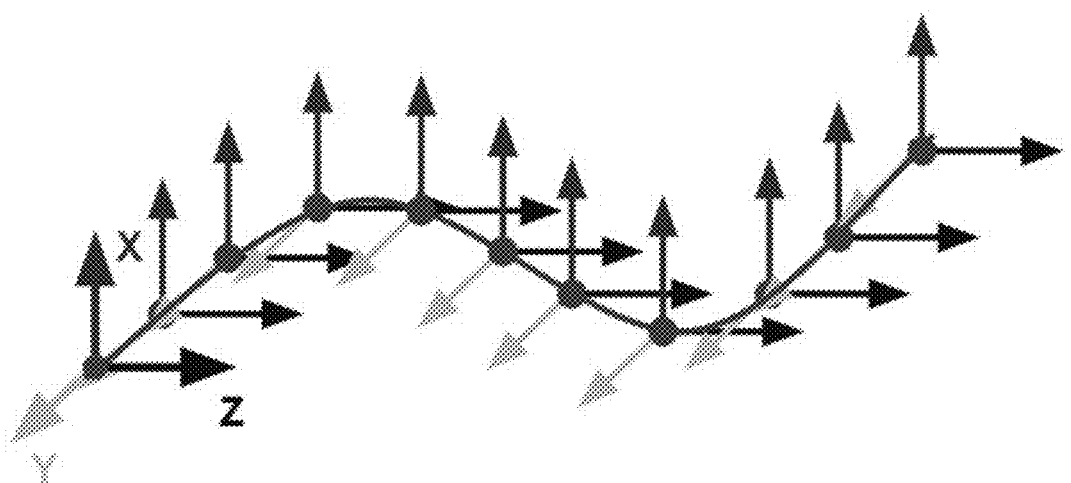
FIG. 1 is a view illustrating a road path using a related-art waypoint method.

In a method of expressing a path of a road by using a waypoint method as shown in FIG. 1, when a road of 100 meters is expressed with a resolution of 1 meter, data of about 1,200 bytes may be required, but, when the moving path is created by a combination of the functions described above as shown in FIG. 4, data from 20 bytes to 56 bytes may be required to express the road of 100 meters, irrespective of a resolution regarding the road. Accordingly, when the traffic simulation method according to the present embodiment is used, a road path in a large region may be expressed with a small amount of data.

The traffic simulation method may calculate 3-dimensional (3D) coordinates regarding a position of the moving object by using the data of the moving path and the start point (S230), and may move the moving object along the moving path in the simulation environment, based on the calculated 3D coordinates (S240).

Herein, the start point refers to a first start point of the moving object within the moving path, and the 3D coordinates regarding the position of the moving object refers to a current point of the moving object within the moving path.

Specifically, at the step of retrieving the data of the moving path and the start point, when a new moving object starts operating in the simulator, data of a moving path and a start point of the moving object starting operating may be retrieved, and at the step of calculating the 3D coordinates, 3D coordinates (x, y, z) of the moving object within the moving path may be calculated, based on the retrieved data of the moving path and the start point, and the moving object may be placed on the calculated coordinates.

In addition, when the next moving position of the moving object is a moving end position of the moving object (S260—Yes), the traffic simulation method may stop moving the moving object and delete from the simulator, and, when the next moving position is not the moving end position (S260—No), the traffic simulation method may calculate 3D coordinates regarding the next moving position again and may move the object.

In addition, when the next position of the moving objet is calculated, the next position of the moving object may be calculated by using moving path (track) information, a length of the moving object, and a current moving speed.

Herein, the next position of the new moving object may be calculated by using Equation 1 presented below, on the assumption that $d_{next}$ is a relative distance from the position of the start point of the moving object to a next position, $d_{curr}$ is a relative distance from the position of the first start point of the moving object to a current position, speed is a current speed of the moving object, step_time is a time that is required for the moving object to move to the next position, vehicle_length is a length of the moving object:

$$d_{next} = d_{curr} + \text{Speed} \times \text{Step\_Time} + \text{Vehicle\_length} \qquad \text{Equation 1}$$

Through this, a motion of the object in the simulator may be precisely created, and reliability of validation regarding an operation of an algorithm mounted in an autonomous driving vehicle may be enhanced.

Figure 5:
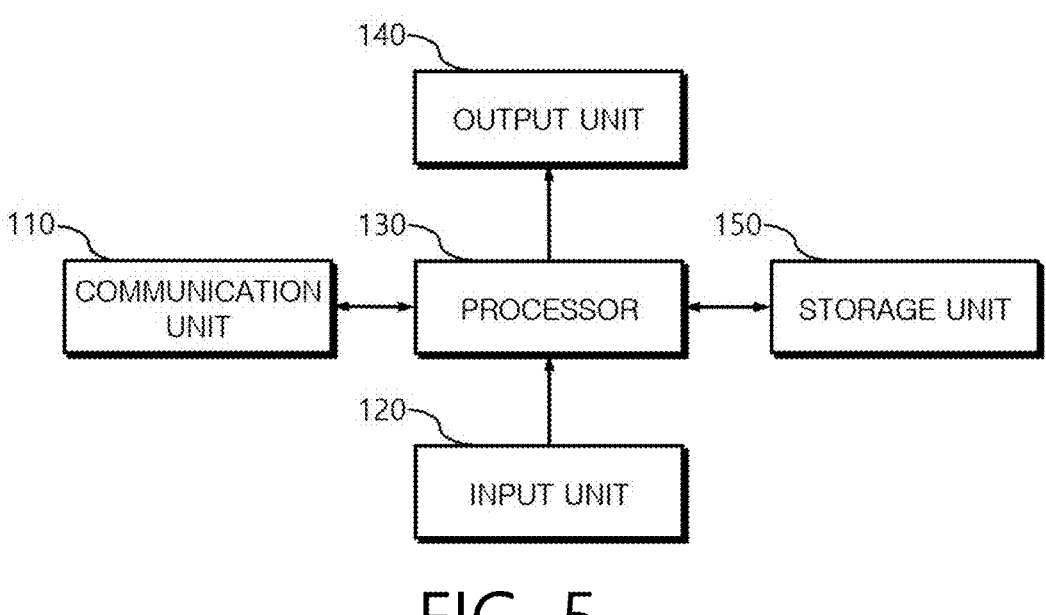
FIG. 5 is a view provided to explain a traffic simulation system to which a traffic simulation method is applied according to an embodiment of the present disclosure.

FIG. 5 is a view provided to explain a traffic simulation system to which the traffic simulation method according to an embodiment of the present disclosure is applied.

Referring to FIG. 5, the traffic simulation system according to the present embodiment includes a communication unit 110, an input unit 120, a processor 130, an output unit 140, and a storage unit 150.

The communication unit 110 is a communication means for performing communication between the traffic simulation system, which is a simulator, and external devices through a network, and may transmit/receive/upload/download data necessary for operations of the processor 130.

The input unit 120 is a means for receiving an input of setting/command related to a simulation.

The processor 130 may perform the traffic simulation method described above with reference to FIGS. 2 to 4.

Specifically, the processor 120 may import a new moving object into a simulation environment, may retrieve data of a moving path and a start point of the moving object among pre-stored data, may calculate 3D coordinates regarding a position of the moving object, may enable the moving object to move along a moving path in the simulation environment, based on the calculated 3D coordinates data, and may calculate a next position of the moving object.

The output unit 140 is a display that outputs information which is processed and calculated through the processor 130, and the storage unit 150 is a storage medium providing a storage space necessary for normal operations of the processor 130.

Specifically, the storage unit 150 may store data regarding a moving path of a moving object and to position of a start point which is created based on a function.

The technical concept of the present disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

The invention claimed is:

1. A traffic simulation method executed by a processor of a simulator, the method comprising:

importing a new moving object into a three-dimensional (3D) simulation environment of a simulator;

retrieving data of a moving path and a start point of the moving object which is created based on a function, among pre-stored data stored in a memory associated with the simulator;

calculating, by the processor, 3D coordinates regarding a position of the moving object based on traffic state parameters;

moving the moving object along the moving path in the simulation environment, based on the calculated 3D coordinates;

calculating a next position of the moving object based on the moving path, a length of the moving object, 3D coordinates, and a current speed of the moving object to create function-based moving path data, by dynamically updating a simulation state stored in the memory to reflect the next position of the moving object within the simulation environment; and controlling a motion of the moving object based on the function-based moving path data, thereby precisely creating the motion of the moving object in the simulator and enhancing reliability of validation regarding an operation of an algorithm mounted in an autonomous driving vehicle.

2. The method of claim 1, wherein the retrieving the data of the moving path and the start point comprises retrieving data regarding a pre-defined moving path and a start point within the pre-defined moving path, by combining one or more functions.

3. The method of claim 2, wherein the one or more functions comprise at least one of a line function, an arc function, a clothoid curve function, a third-degree polynomial function, and a parametric third-degree polynomial function.

4. The method of claim 2, wherein the start point of the moving object refers to a first start point of the moving object within the moving path, and wherein the 3D coordinates regarding the position of the moving object refers to a current point of the moving object within the moving path.

5. The method of claim 4, wherein the retrieving the data of the moving path and the start point comprises, when the new moving object starts operating in the simulator, retrieving data of a moving path and a start point of the moving object which starts operating, and wherein the calculating the 3D coordinates comprises calculating 3D coordinates (x, y, z) of the moving object within the moving path, based on the retrieved data of the moving path and the start point, and placing the moving object on the calculated coordinates.

6. The method of claim 1, wherein the step of calculating the next position comprises calculating the next position of the moving object by using Equation 1 presented below:

$$d_{next} = d_{curr} + \text{Speed} \times \text{Step\_Time} + \text{Vehicle\_length} \qquad \text{Equation 1}$$

where $d_{next}$ is a relative distance from a position of the start point of the moving object to the next position, $d_{curr}$ is a relative distance from a position of the first start point of the moving object to a current position, speed is a current speed of the moving object, step_time is a time that is required for the moving object to move to the next position, and vehicle_length is a length of the moving object.

7. A traffic simulation system comprising:

a processor configured to:

import a new moving object into a three-dimensional (3D) simulation environment of a simulator;

retrieve data of a moving path and a start point of the moving object which is created based on a function, among pre-stored data stored in a memory associated with the simulator;

calculate 3D coordinates regarding a position of the moving object based on real-time sensor data or traffic state parameters;

move the moving object along the moving path in the simulation environment, based on the calculated 3D coordinates;

calculate a next position of the moving object based on the moving path, a length of the moving object, 3D coordinates, and a current speed of the moving object to create function-based moving path data, by dynamically updating a simulation state stored in the memory to reflect the next position of the moving object within the simulation environment;

controlling a motion of the moving object based on the function-based moving path data, thereby precisely creating the motion of the moving object in the simulator and enhancing reliability of validation regarding an operation of an algorithm mounted in an autonomous driving vehicle; and output information which is processed and calculated through the processor.

8. The system of claim 7, wherein, for the retrieving the data of the moving path and the start point, the processor is configured to retrieve data regarding a pre-defined moving path and a start point within the pre-defined moving path, by combining one or more functions.

9. The system of claim 8, wherein the one or more functions comprise at least one of a line function, an arc function, a clothoid curve function, a third-degree polynomial function, and a parametric third-degree polynomial function.

10. The system of claim 8, wherein the start point of the moving object refers to a first start point of the moving object within the moving path, and wherein the 3D coordinates regarding the position of the moving object refers to a current point of the moving object within the moving path.

11. The system of claim 10, wherein, for the retrieving the data of the moving path and the start point, the processor is configured to, when the new moving object starts operating in the simulator, retrieve data of a moving path and a start point of the moving object which starts operating, and wherein, for the calculating the 3D coordinates, the processor is configured to calculate 3D coordinates (x, y, z) of the moving object within the moving path, based on the retrieved data of the moving path and the start point, and place the moving object on the calculated coordinates.

12. The system of claim 8, wherein, for the calculating the next position, the processor is configured to calculate the next position of the moving object by using Equation 1 presented below:

$$d_{next} = d_{curr} + \text{Speed} \times \text{Step\_Time} + \text{Vehicle\_length} \qquad \text{Equation 1}$$

where $d_{next}$ is a relative distance from a position of the start point of the moving object to the next position, $d_{curr}$ is a relative distance from a position of the first start point of the moving object to a current position, speed is a current speed of the moving object, step_time is a time that is required for the moving object to move to the next position, and vehicle_length is a length of the moving object.

* * * * *